United States Patent
Hogan

(10) Patent No.: US 11,629,989 B1
(45) Date of Patent: Apr. 18, 2023

(54) LEVEL SENSING FOR DISPENSER CANISTERS

(71) Applicant: Fluid Management, Inc., Wheeling, IL (US)

(72) Inventor: Tim Patrick Hogan, Bristol, WI (US)

(73) Assignee: Fluid Management, Inc., Wheeling, IL (US)

( * ) Notice: Subject to any disclaimer, the term of this patent is extended or adjusted under 35 U.S.C. 154(b) by 0 days.

(21) Appl. No.: 17/503,424

(22) Filed: Oct. 18, 2021

(51) Int. Cl.
G01F 23/00 (2022.01)
G01F 23/16 (2006.01)

(52) U.S. Cl.
CPC ................... *G01F 23/164* (2013.01)

(58) Field of Classification Search
CPC ....................................... G01F 23/164
See application file for complete search history.

(56) References Cited

U.S. PATENT DOCUMENTS

| 4,993,754 | A | | 2/1991 | Templin, Jr. | |
|---|---|---|---|---|---|
| 5,072,617 | A | * | 12/1991 | Weiss | G01F 23/164 73/299 |
| 9,677,923 | B1 | | 6/2017 | Daneyshar et al. | |
| 2015/0285703 | A1 | | 10/2015 | Ishikawa et al. | |
| 2016/0020928 | A1 | | 7/2016 | Kaneko et al. | |
| 2018/0224314 | A1 | | 8/2018 | Yoshida et al. | |
| 2020/0088560 | A1 | | 3/2020 | Pieczaba et al. | |

FOREIGN PATENT DOCUMENTS

| CN | 2223485 | * | 5/1996 | |
|---|---|---|---|---|
| CN | 1707231 A | * | 12/2005 | |
| CN | 2226282 | * | 12/2005 | |
| CN | 100374837 C | * | 3/2008 | |
| DE | 102013006667 A1 | * | 10/2014 | ........... A61M 1/1658 |
| WO | WO-2013144848 A1 | * | 10/2013 | ........... B01D 61/027 |

OTHER PUBLICATIONS

The International Search Report and The Written Opinion of the International Searching Authority, or The Declaration from corresponding PCT Application No. PCT/US2022/046929, dated Jan. 25, 2023, 14 pages.

* cited by examiner

Primary Examiner — Jamel E Williams
(74) Attorney, Agent, or Firm — Tucker Ellis LLP; Heather M. Barnes; Michael G. Craig

(57) ABSTRACT

One or more techniques and/or systems are disclosed for providing level sensing of a fluid in a dispenser canister. The sensor includes a housing having a fluid cavity configured to receive a fluid therein, with the housing having an open end and an opening in a wall opposite the open end. The sensor has a diaphragm coupled to and closing the open end of the housing and a sensing device having a sensing end. The sensing device is coupled to the housing with the sensing end extending into the opening of the wall of the housing, thereby not making direct contact with the fluid.

19 Claims, 12 Drawing Sheets

LEVEL SENSING FOR DISPENSER CANISTERS

BACKGROUND

Dispenser canisters are used in retail paint tinting equipment to dispense colorant into a paint tinting process. Colorant is dispensed to provide a desired paint color by utilizing specific combinations of colorant. The volume of colorant in the dispenser canisters can be monitored so that the canisters do not become empty during a paint tinting process. An empty canister during a paint tinting process may result in paint that is tinted to the wrong color, lost profits, poor results, wasted product, disposal costs, customer dissatisfaction, or service calls. Various level sensing technologies are used in the paint tinting industry to monitor colorant canister levels, but often the accuracy is compromised by colorant and canister properties that interfere with sensor technology (e.g. colorant viscosity, canister coating, etc.), as well as corrosion of the sensors over time. Accurate level sensing with a more robust sensor can help to have paint that is tinted to the correct color.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for sensing a level of a material disposed in a dispensing canister to provide a desired volume of the material in the canister. For example, the level sensing system may be used to determine that there is a sufficient volume of colorant in a dispensing canister in order to perform a paint tinting or hair dye tinting process. Having a sufficient volume of colorant helps to mitigate air entering the pump, tubing, and nozzles of the tinting machine. Further it helps mitigate incorrectly tinted product, wasted product, wasted colorant, and disposal issues associated with a less than desired tinting process.

In one implementation for providing level sensing, a sensor includes a housing having a fluid cavity configured to receive a fluid therein, with the housing having an open end and an opening in a wall opposite the open end. The sensor has a diaphragm coupled to and closing the open end of the housing and a sensing device having a sensing end. The sensing device is coupled to the housing with the sensing end extending into the opening of the wall of the housing, thereby not making direct contact with the fluid.

In another implementation, a fluid dispensing system includes a dispenser canister, a tube elbow coupled to a bottom of the dispenser canister, and a sensor coupled to the tube elbow. The sensor is configured as described above.

In yet another implementation, a method for level sensing of a fluid in a dispenser container includes assembling a sensor with a housing having a fluid cavity configured to receive a fluid therein, the housing having an open end and an opening in a wall opposite the open end, a diaphragm coupled to and closing the open end of the housing, and a sensing device having a sensing end, the sensing device coupled to the housing with the sensing end extending into the opening of the wall of the housing. The method further includes configuring the sensor for removable coupling to a tube elbow of the dispenser container.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

Figure 1:
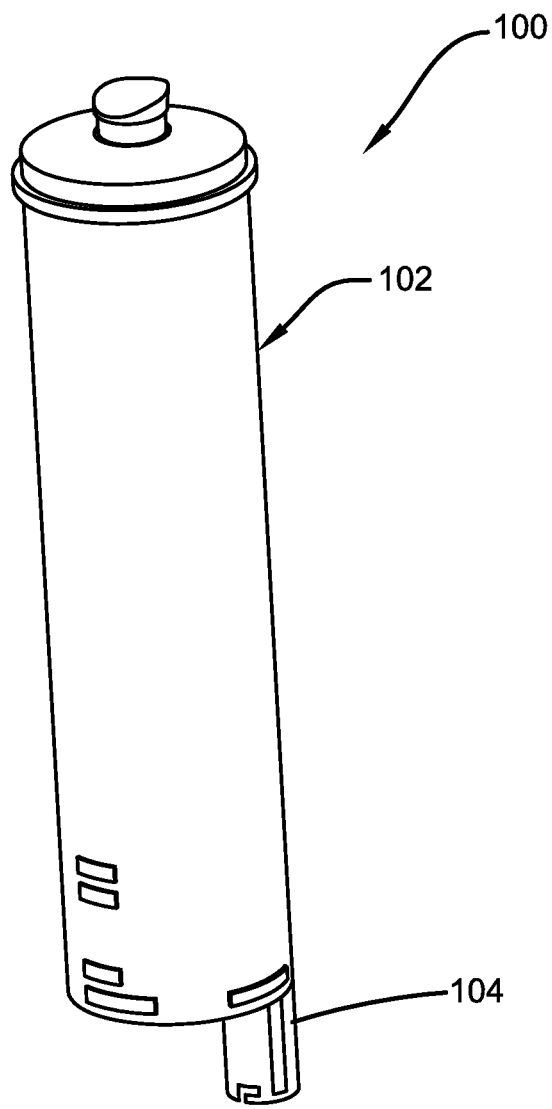
FIG. 1 is a component diagram illustrating an example dispenser canister that utilizes level sensing according to one implementation.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different applications, such as for level sensing in different paint tinting applications and in different tinting systems. That is, the herein disclosed examples can be implemented in different tinting applications other than for paint tinting.

FIG. 1 is a component diagram illustrating an example of a portion of a system 100 in which a sensor for detecting a level of colorant in a colorant dispensing container (e.g., a dispenser canister 102) as described herein can be used. In one implementation, the dispenser canister 102 is configured to be used in a paint tinting machine to store colorant used to tint paint. The dispenser canister 102 may be equipped with a level sensing system (including a sensor 200 illustrated in FIG. 2) to detect the presence of colorant in the dispenser canister 102, for example, to identify whether a desired amount of colorant is present in the dispenser canister 102 to perform a desired task (e.g., tinting a paint). In this implementation, the level sensing arrangement may be engaged with the dispenser canister 102 at a desired location relative to the dispensing canister (e.g., below the dispenser canister 102 at a location indicating a low level of colorant within the dispenser canister 102, etc., such as coupled to a lower tube 104 of the dispenser canister 102). As one example, the level of the colorant may be used, and combined with the known dimensions of the dispenser canister 102, to determine the volume of colorant remaining in the dispensing canister.

Figure 2:
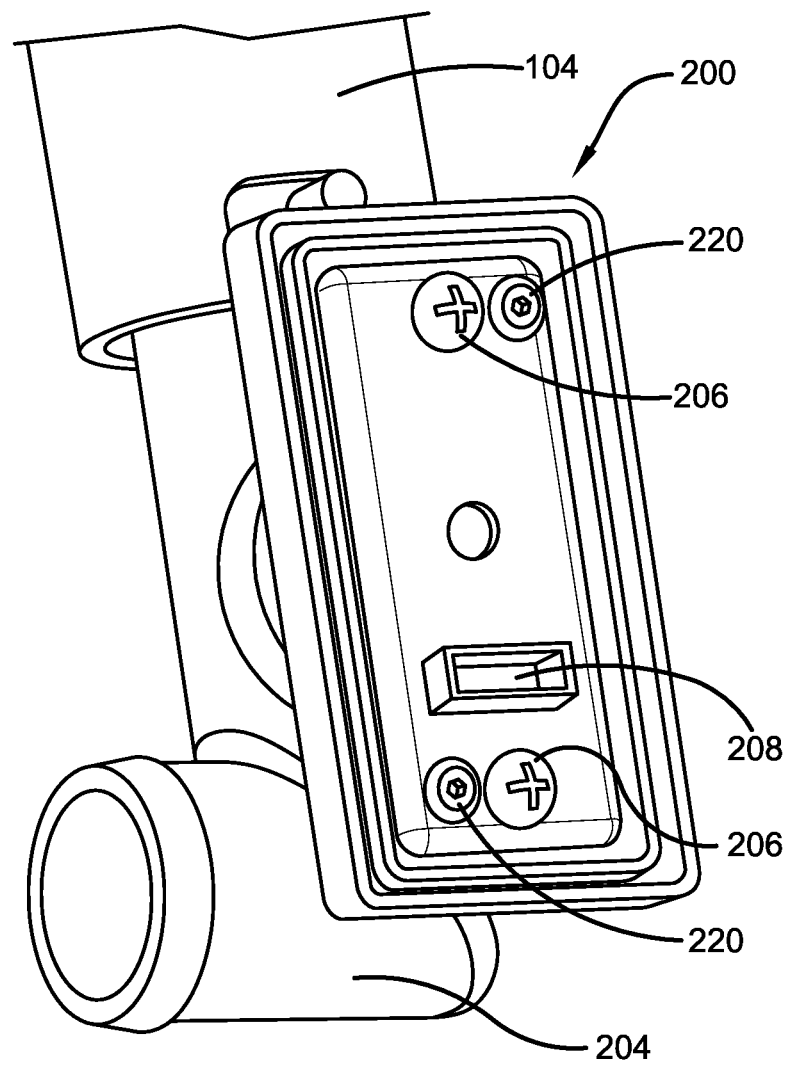
FIG. 2 is a diagram illustrating a sensor coupled to a portion of a dispenser canister tube according to one implementation.

In various examples, and with particular reference to FIG. 2, the sensor 200 is configured as a removable sensor, such as a removable fluid or pressure sensor. The sensor 200 is removably coupled with the lower tube 104 to allow for fluid or pressure sensing to determine a level of colorant within the dispenser canister 102. Level sensing offers advantageous detection of a liquid volume at a predetermined position in the dispenser canister 102, for example, at a designated refill level. In detecting when a liquid volume is at a specific predetermined position, various examples may help, for example, prevent a user from running the dispenser system dry. In one example, a warning may be output by the dispensing system when the predetermined level is reached. Because, when a dispenser system is run dry, damage to pumps may occur. Such damage may incur cost and/or warranty issues, for example. Prevention of such conditions helps alleviate a user from knowingly or unknowingly damaging the system.

As can be seen in FIG. 2, the sensor 200 is configured as a removable fluid sense module that is detachably coupled or mounted to a tube elbow 204 coupled with the lower tube 104. In this example, the sensor 200 is coupled to a top portion of the tube elbow 204. The coupling arrangement for attaching the sensor 200 to the tube elbow 204 can be accomplished using any suitable attachment or coupling mechanism, such as fasteners 206 (e.g., screws) that fixedly couple the sensor 200 to the tube elbow 204. However, as should be appreciated, the placement and mounting of the sensor 200 can be varied as desired or needed (e.g., based on the system configuration, tube configuration, etc.), including on different surfaces of the tube elbow 204, on different tubes, etc.

With the sensor 200 installed, fluid sensing can be performed and a sensing output provided to an external controller or monitor (not shown). For example, the sensor 200 includes an interface 208 that can be communicatively coupled to the external controller or monitor, which may be implemented in hardware, software, or a combination thereof. That is, the interface 208 allows for communication between the external controller or monitor and the sensor 200. For example, a user may wish to have more data regarding the current level of the dispenser canister 102 in situations, apart from a designated refill level. Determining the level of the fluid in the dispenser canister 102 with the herein described examples provides a sensing system that uses an individual sensor (e.g., the sensor 200) to detect the fluid volume level of dispenser canister 102 that can decrease cost and complexity. A system can be devised for continuous detection of the level of material in the dispensing canister 102 instead of having multiple probes and/or thermistors being placed at different levels of the respective canisters. In one particular implementation, the sensor 200 is operable as part of a pressure sensing system used to continuously detect the level of the material in the dispenser canister 102, which may offer desired advantages.

Figure 3:
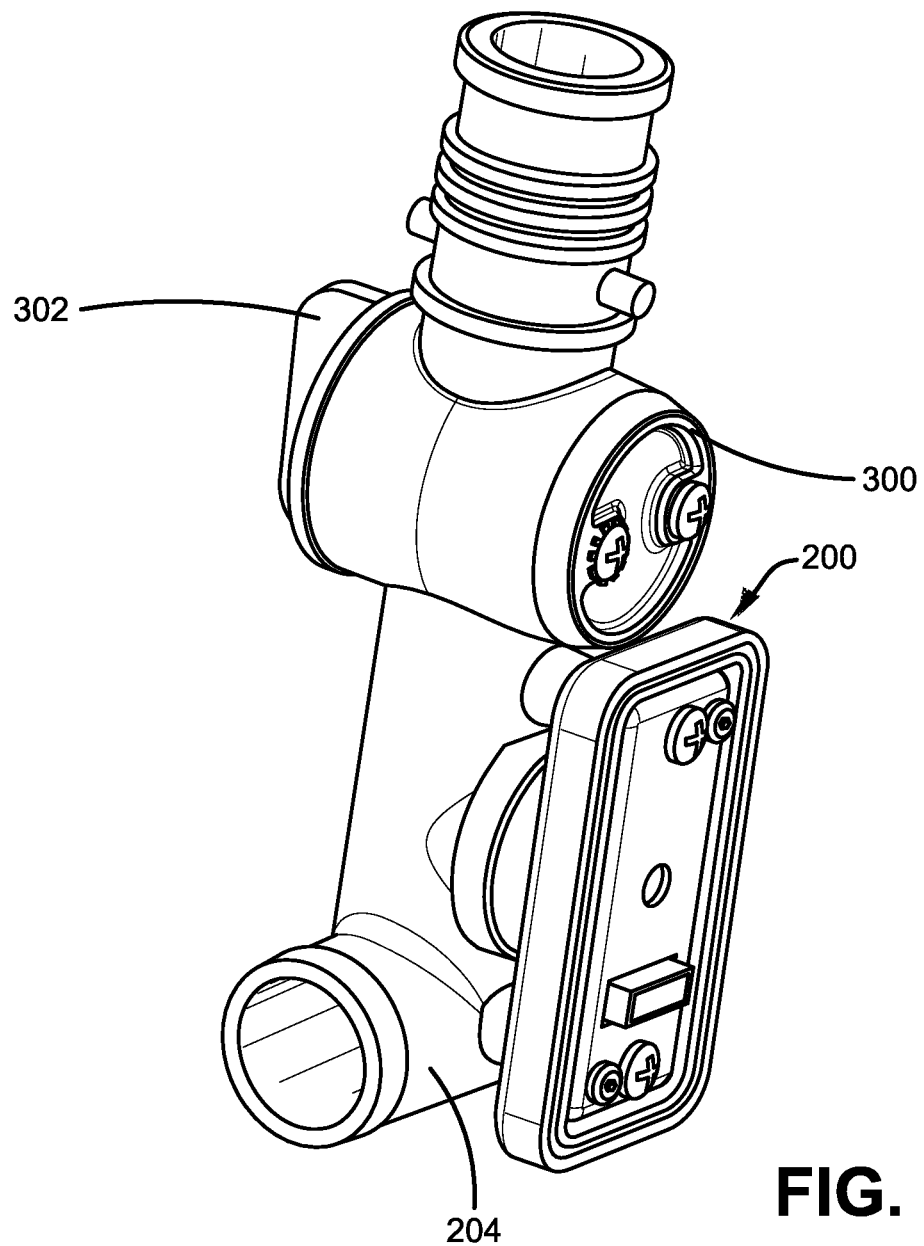
FIG. 3 is a diagram of a sensor coupled to a portion of a dispenser canister tube according to one implementation and illustrating a shutoff valve.

Variations and modifications are contemplated. For example, as illustrated in FIG. 3, a valve 300 is provided upstream (above in the illustrated example) of the sensor 200 to allow manual flow control from the dispenser canister 102. That is, the valve 300 is operable to selectively control the flow rate from the dispenser canister 102 and through the tube elbow 204. The valve 300 includes an adjustment control 302 (illustrated as a knob) that is operable by a user to change the flow rate. For example, a user is able to turn or rotate the adjustment control 302 to change the flow rate into the tube elbow 204. In some examples, the valve is configured as a manual shutoff valve having open and closed positions that are selectable by rotating the adjustment control 302. The valve 300 can be any suitable fluid control valve.

Figure 4:
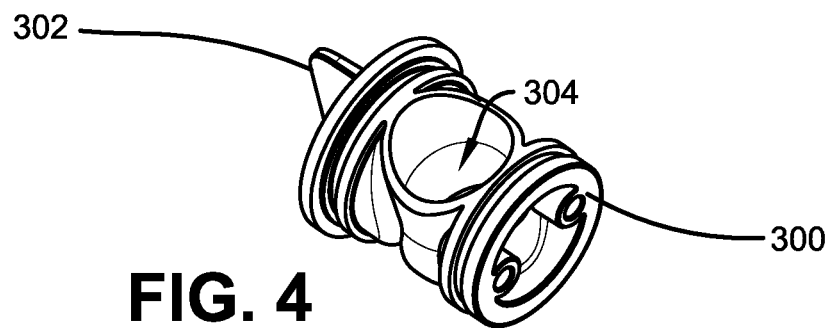
FIG. 4 is a diagram illustrating one implementation of a barrel valve.

In one implementation, the valve 300 is a molded barrel valve as illustrated in FIG. 4 that has an opening 304 therethrough. In operation, the opening 304 is rotated to change the fluid flow through the tube elbow 204. It should be noted that in some examples, the valve 300 is provided without the sensor 200. For example, different configurations are contemplated that include only the sensor 200, only the valve 300, or both the sensor 200 and valve 300.

Thus, in various examples, the sensor 200 is mounted on the tube elbow 204 below the dispenser canister 102. While the sensor 200 is mounted below the dispenser canister 102, the sensor 200 is not mounted directly to the bottom of the dispenser canister 102 or to other portions of the dispenser canister 102. However, the placement of the sensor 200 can be varied in other implementations.

In operation, the sensor 200 is configured to perform fluid level sensing, such as continuous level sensing. For example, the sensor 200 in some implementations forms part of a level sensing system that may include a motor control board communicatively (e.g., electrically and/or data communication) coupled with the sensor 200 and that are engaged with the dispensing canister 102. The motor control board may include (e.g., or be coupled with) components that allow or operate one or more of a power source, one or more motor drivers, an encoder circuit, bus, and a motor control unit (MCU). However, it should be appreciated that any suitable components can be used. For example, the power source may be direct current (DC), such as provided by an alternate current (AC) to DC converter, or directly as DC (e.g., battery power, or other); or can be AC provided by a separate poser supply (e.g., utility provided, etc.). The one or more motor drivers can be coupled with or comprised on the motor control board, may individually interface to respective, corresponding motors. For example, the motor driver (e.g., motor controller) may be electronically coupled with a dispensing motor engaged with the dispensing canister 102; and the motor driver may be electronically coupled with an agitation motor of the dispensing canister 102. The encoder circuit may be engaged with an encoder of the dispensing motor, for example, to convert a circuit signal to an electrical signal to the motor. The encoder may be a magnetic encoder, for example. The bus may communicatively couple the motor control board with other components, such as processing circuits, of the level sensing system. For example, the bus may connect the motor control board to electronic circuits. The bus may also connect to control circuit(s), memory, and/or processor(s). In one implementation, the bus may be a controller area network (CAN) bus, for example. The MCU may control motor drivers of respective motors. The MCU may be an ARM motor control unit, in an example implementation.

Figure 5:
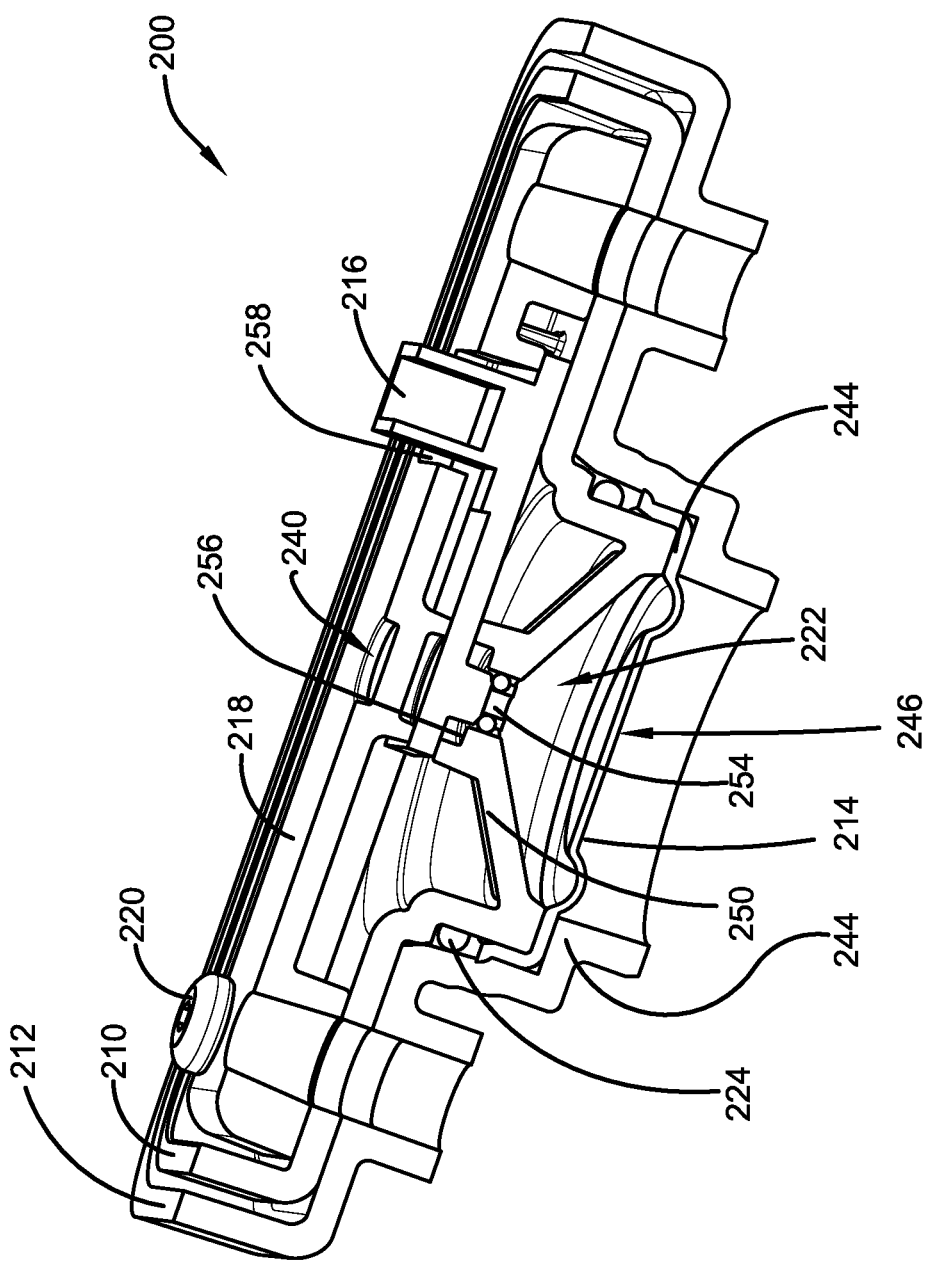
FIG. 5 is a cross sectional component diagram illustrating one or more portions of a sensor according to one implementation.
Figure 6:
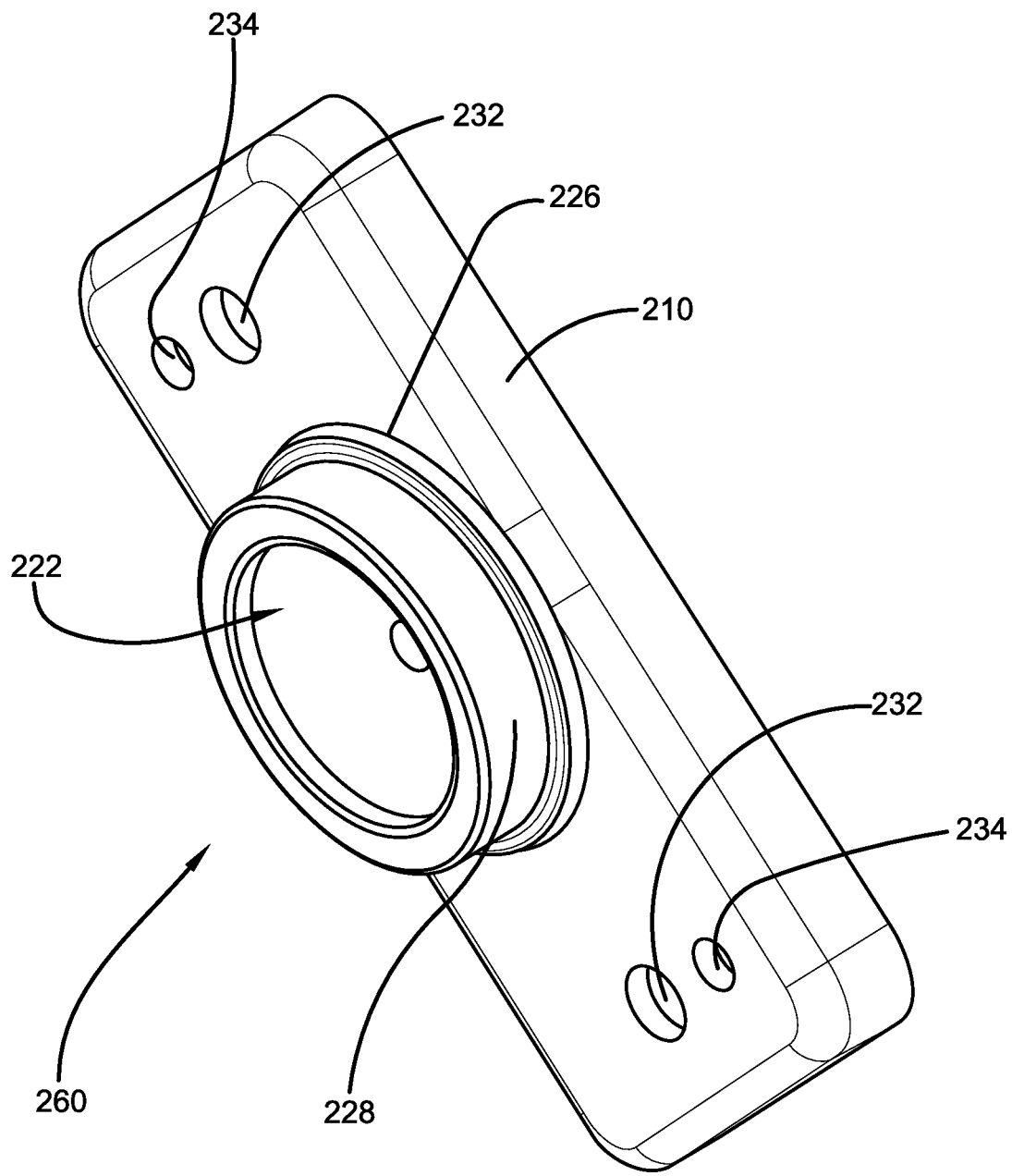
FIG. 6 illustrates one implementation of an upper housing of the sensor of FIG. 5.

As illustrated in FIG. 5, in a non-limiting implementation, the sensor 200 is configured as a pressure sensor with a diaphragm. More particularly, the sensor 200 includes an upper housing 210 and a lower housing 212 (collectively referred to as the housing of the sensor 200) with a diaphragm 214 positioned (e.g., sandwiched) therebetween. A seal 224 (illustrated as an O-ring) is disposed above the diaphragm 214 (as viewed in FIG. 5) to provide a fluid seal within the diaphragm 214. A sensing device 216 (e.g., a printed circuit board (PCB)-mounted pressure sensing device) is coupled within the upper housing 210 and held in place by a retaining structure 218 (e.g., a PCB retainer) that is secured to the upper housing 210 using one or more fasteners 220 (e.g., one or more screws). As described in more detail herein, the configuration of the components facilitates a cavity 222 (e.g., a fluid chamber) being formed in part by the diaphragm 214 to be fluid filled, such as with an oil, while purging of air with reduced or minimized likelihood of air bubbles. The configuration also allows filling of the cavity 222 (also referred to as the fluid cavity 222) with an accurate volume of oil. As will be described in more detail herein, the components of the sensor 200 are configured to form an opening 240 therethrough to allow for filling of the cavity 222 (e.g., openings formed through each of the component parts and aligned when assembled to provide access to the cavity 222).

The component assembly and an example of the mechanical coupling of the various components of the sensor 200 will now be described in connection with FIGS. 5-10. As can be seen, the seal 224 is positioned adjacent and abutting a shoulder 226 (e.g., a circumferential rim) of a fluid housing 228 that extends from a base 230 of the upper housing 210 (See FIG. 6). The seal 224 surrounds the outer circumference of the fluid housing 228 to form a fluid tight seal as described in more detail herein. In the illustrated example, the fluid housing 228 is circular and defines the cavity 222 therein, which is conical shaped. That is, the inner portion of the fluid housing 228 has tapered or sloped walls 250 (see FIG. 5 illustrating interior walls that are tapered or sloped away from exterior walls that are planar) that are shaped to form a cone that is configured to receive fluid therein as described in more detail herein. As can be seen, the base 230 includes openings 232 and 234 to receive fasteners therethrough.

Figure 7:
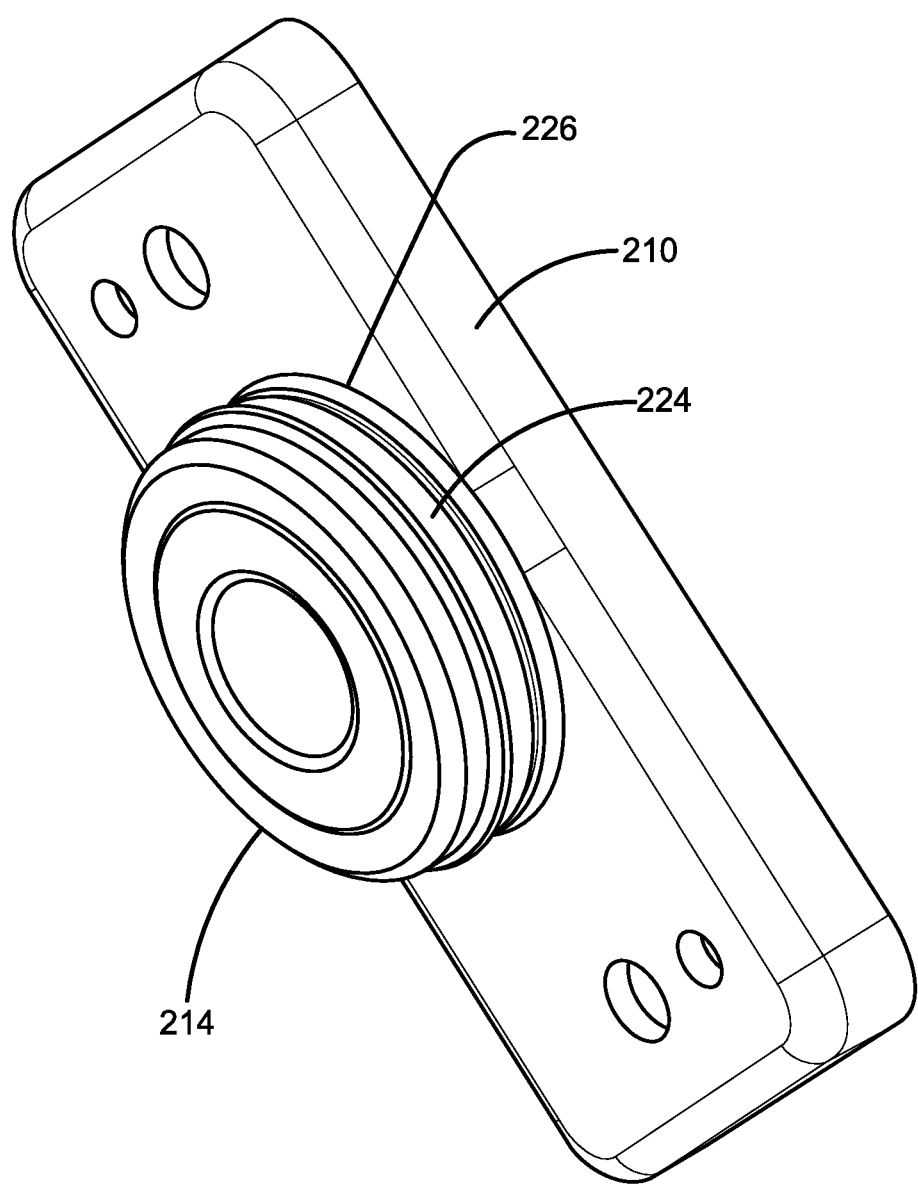
FIG. 7 illustrates one implementation of a diaphragm of the sensor of FIG. 5.
Figure 8:
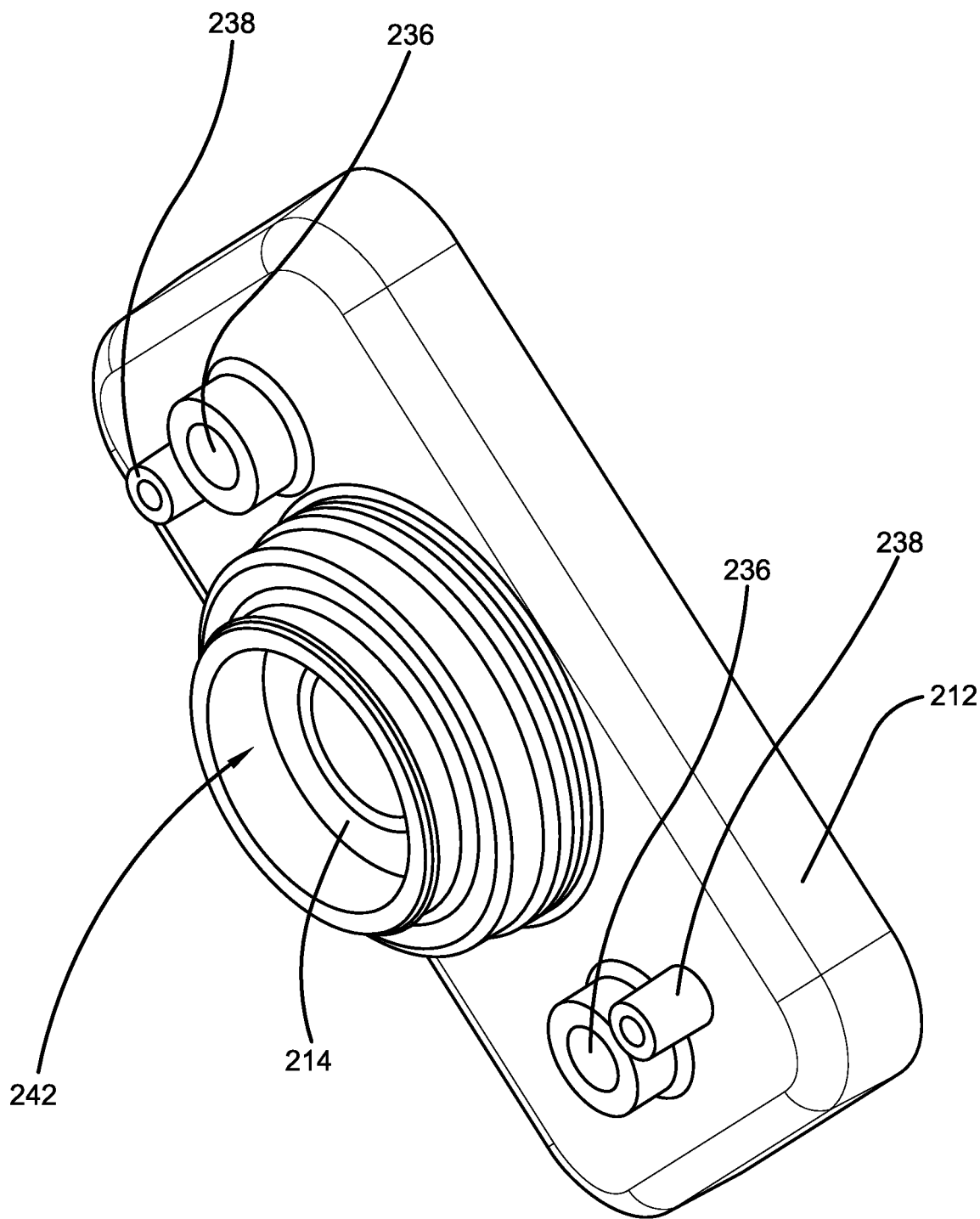
FIG. 8 illustrates one implementation of a lower housing of the sensor of FIG. 5.
Figure 9:
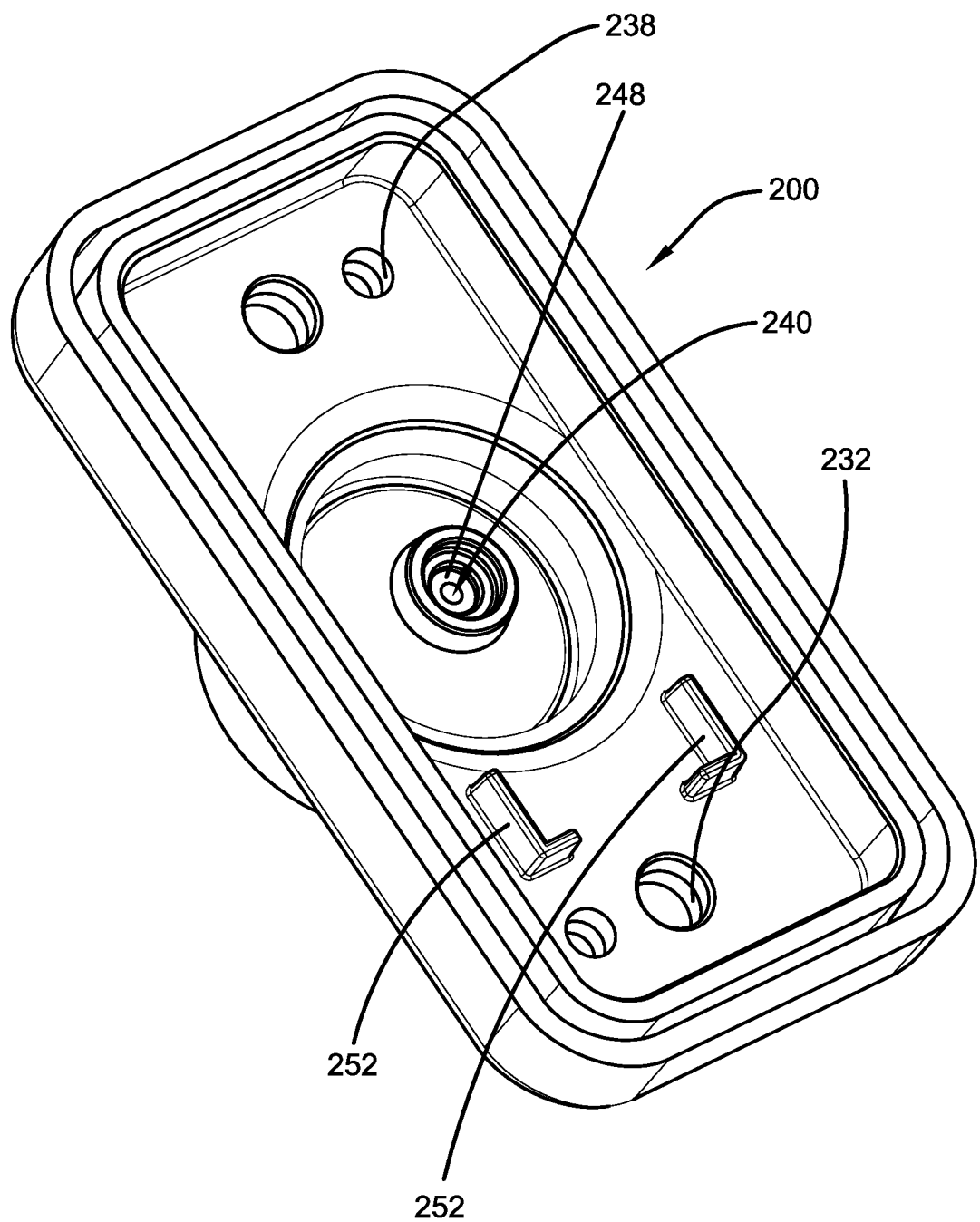
FIG. 9 illustrates one implementation of a seal of the sensor of FIG. 5.
Figure 10:
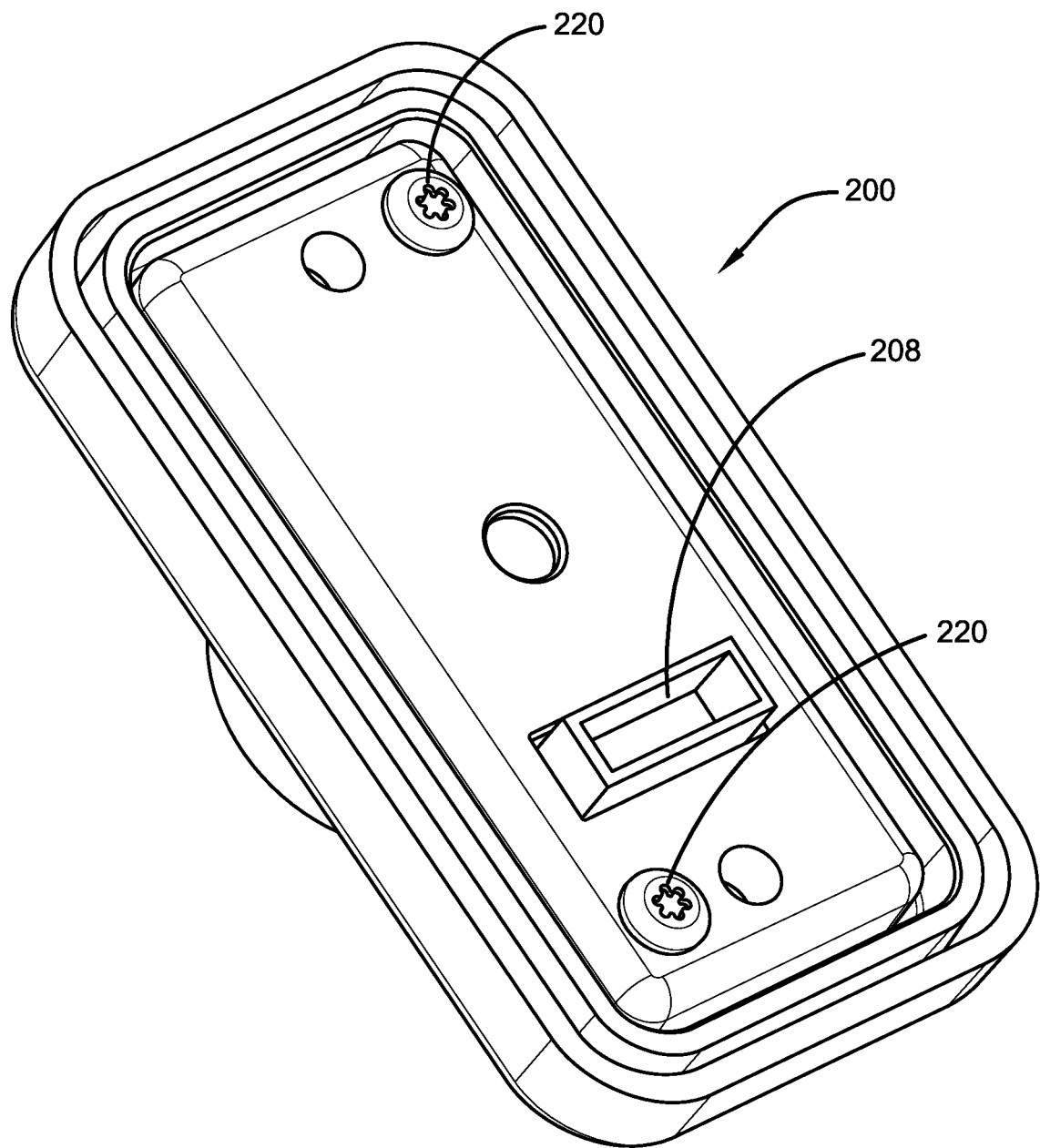
FIG. 10 illustrates one implementation of an interface and a retaining structure of the sensor of FIG. 5.

The diaphragm 214 is coupled to the fluid housing 228 adjacent to the seal 224 (see FIG. 7). That is, the diaphragm 214 is positioned on and over an open end 260 of the fluid housing 228 to seal the cavity 222, thereby closing the open end 260. As such, the diaphragm 214 forms a sensing surface of the sensor 200 that will be positioned in contact with fluid flow from the dispenser canister 102.

The diaphragm 214 and the seal 224 are formed from a fluid impermeable material, such as a fluid impermeable rubber. In some examples, the diaphragm 214 and the seal 224 are formed from a flexible or resilient material that allows for the diaphragm 214 and the seal 224 to be stretched and positioned on the fluid housing 228. That is, the diaphragm 214 and the seal 224 are expanded and positioned over the fluid housing 228 and then released to form the fluid tight connection or engagement. In some examples, a securing material (e.g., glue) may be used to more fixedly secure the diaphragm 214 and/or the seal 224 to fluid housing 228. The lower housing 212 is then positioned on the upper housing 210 (see FIG. 8) such that the diaphragm 214 is positioned within an opening 242 of the lower housing 212. That is, the diaphragm 214 is held in place between the upper housing 210 and the lower housing 212 along an edge 244 of the diaphragm 214 (see FIG. 5). In the illustrated example, the upper housing 210 and the lower housing 212 are sized and shaped to fit together such that the diaphragm 214 is sandwiched therebetween along the edge 244, while allowing a middle portion 246 to move, such as be compressed inwardly toward the cavity 222, when a pressure is applied thereto (e.g., pressure from colorant within the dispenser canister 102 acting on the diaphragm 214). As should be appreciated, as the colorant within the dispenser canister 102 is used and the dispenser canister 102 becomes less filled, the pressure on the diaphragm 214 is reduced. That is, with a reduced volume of colorant (and a corresponding reduced weight) the pressure applied on the diaphragm 214 becomes lower.

As can be seen, the lower housing 212 has openings 236 and 238 complementary to the opening 232 and 234, respectively, of the base 230 of the upper housing 210. That is, with the lower housing 212 assembled to the upper housing 210, the openings 232 and 236 are aligned and the openings 234 and 238 are aligned, such that a fastener can pass therethrough to couple the components together and/or to the tube elbow 204.

With the upper housing 210 assembled to (e.g., positioned on) the lower housing 212, the cavity is ready for filling, such as with a non-compressible fluid (e.g., a non-compressible oil). A seal 248 (e.g., an O-ring seal) is positioned at the opening 240 (see FIG. 9) before fluid is provided within the cavity 222. However, as should be appreciated, the seal 248 can be positioned at the opening 240 after filling the cavity 222.

In operation, the cavity 222 is filled by injecting fluid therein. For example, oil is injected into the cavity 222 using a syringe, which in some examples has a predefined amount of oil therein based on the volume of the cavity 222. In one implementation, a needle of the syringe is injected into the opening 240 and through the diaphragm 214 to access the cavity 222. That is, there are no openings through the diaphragm 214 and the needle penetrates through the rubber material of the diaphragm 214 in order to inject the oil within the cavity 222. In some examples, the walls of the diaphragm 214 have a thickness to maintain the oil within the cavity 222 as well as to prevent fluid from exiting the needle puncture site after filling of the cavity 222. Thus, oil is injected from the top, through opening 240, using a syringe, and filling the cavity 222 with a specific volume of oil. Due to the conical shape of the cavity 222, there are no sharp inside corners (e.g., the sloped walls 250) to trap air bubbles while filling with oil and allowing air to be purged as the filling process progresses.

With the cavity 222 filled with oil, the remaining components are installed. That is, mounting portions 252 are configured to align the sensing device 216 within the upper housing 210 such that a sensing end 254 extends into the opening 256 (see FIG. 5) of the upper housing 210 through the seal 248. In the illustrated example, the opening 256 is opposite the open end 260. As such, the sensing end 254 (e.g., a force gauge) of the sensing device 216 is in fluid communication with the fluid injected within the cavity 222. As can be seen, the sensing portion of the sensing device 216 is thereby disposed to allow for pressure measurements to be obtained from a pressure being applied to the diaphragm 214. In operation, pressure on the diaphragm 214 causes pressure to be applied to the non-compressible fluid within the cavity 222, transferring that pressure force to the sensing end 254, which is configured to measure a pressure applied thereto.

In various examples, the sensing end 254 comprises a liquid proof pressure sensor component that detects pressure at a desired or predetermined location, such as within the tube elbow 204, which corresponds to a pressure being applied by the colorant within the dispenser canister 102 on the diaphragm 214. The pressure sensor component forming the sensing end 254 can be, for example, a strain gauge type, capacitive type, electromagnetic type, piezoelectric type, optical type, potentiometric type, or other type of sensor component that is appropriate for sending pressure measurements or information as described herein. For example, the sensing end 254 is a waterproof sensor commercially available from STMicroelectronics. The waterproof pressure sensor in some examples is used to detect an actual level of the fluid in dispenser canister 102 in a 'gas gauge' flow meter type of reading.

In one implementation, the sensing device 216 provides data indicative of the sensed pressure (e.g., the data may be transmitted from or pulled from the sensing device 216) to a control board. Alternately, the data indicative of a sensed pressure may be communicated to a separate processing unit (e.g., processor). The data indicative of the sensed pressure, for example, can be used to identify an amount (e.g., volume, level in the dispenser canister 102, weight) of the material in the dispenser canister 102. For example, as the material is drawn down from the dispenser canister 102, the pressure indicated at the sensing device 216 is likewise reduced (e.g., proportionally). In one implementation, the sensed pressure can be compared with known pressure to material amount information to identify an amount of material remaining in the dispenser canister 102.

Referring again to the structural components of the sensor 200, the retaining structure 218 is then positioned on the sensing device 216 within the upper housing 210. As can be seen, the retaining structure 218 has an opening 258 configured to receive therethrough a portion of the sensing device 216, namely the interface 208 (see FIG. 9). The components are then coupled together using fasteners 220 extending through the opening 234 and into the opening 238. That is, the fasteners 220 fixedly secure the components together. Additionally, the fasteners 206 (see FIG. 2) extend through the openings 232 and 236 to couple the sensor 200 to the tube elbow 204.

Thus, in various examples, a sensor (e.g., the sensor 200) is provided that includes a housing having a fluid cavity configured to receive a fluid therein, wherein the housing has an open end and an opening in a wall opposite the open end. A diaphragm is coupled to and closes the open end of the housing. The sensor includes a sensing device having a sensing end, wherein the sensing device is coupled to the housing with the sensing end extending into the opening of the wall of the housing. In some examples, the sensor allows for pressure sensing without exposing the sensing component, namely the sensing end 254 to direct contact with the colorant. That is, the sensing end 254 of the sensing device 216 is isolated from the colorant by the diaphragm 214. As such, level sensing can be performed using pressure measurements with a more robust sensor design, for example, longer useful life without corrosion. For example, the material, such as fluid (e.g., colorants), in the dispenser canister 102 may be corrosive. In the various implementations, to protect against the corrosive fluid, the sensing device 216, particularly the sensing end 254, is not in direct contact with the corrosive fluid.

It should be noted that the fluid contained within the dispenser canister 102 may comprise water, glycol, or different colorants. In some implementations, the resolution of the data provided by the sensor 200 may increase in proportion to an increased density of the medium being measured. That is, for example, material with higher density may result in a more accurate reading from the sensor than material with a lower density. In one implementation, the density of the material contained within the dispenser canister 102 (e.g., and respective dispenser canisters in a multi-canister system) may be saved in memory coupled with a control circuit (e.g., processor) of a pressure sensor level sensing system. That is, for example, a known density for a material can be input to the memory and linked to a container holding that material. While density information may not be needed to identify canister material amount information, in one implementation, this information can be used for calculating related parameters that may be utilized by a user of the level sensing system.

In some implementations, even at relatively lower resolution for the sensor data, the pressure sensing using the herein described implementations is able to determine at least 12-16 different stable material level positions within the dispensing canister 102. That is, for example, the level of the material in the dispensing canister 102 can be determined at least at 12 to 16 positions. In some implementations, as the resolution of the sensor data increases, level sensing is can be determined in a continuous range of stable positions within the dispensing canister 102.

In some implementations, in order to increase accuracy and/or precision of the level sensing, an ambient pressure sensor (not shown) may be utilized with the system, along with the sensor 200. In this implementation, the ambient pressure sensor may be, for example, an air pressure sensor, barometric pressure sensor, or the like. As an example, the ambient pressure sensor may continuously or periodically measure the atmospheric pressure proximate to the pressure sensing. In one implementation, utilizing data from the sensor 200 and the ambient pressure sensor, level sensing can determine the absolute pressure of the material disposed in the dispensing canister 102, due to the current volume of fluid within the dispensing canister 102, and accordingly, the amount of fluid in the canister respective of changes in local external pressure.

In some implementations, the temperature of the fluid within dispensing canister 102 may have some effect on the accuracy and/or precision of material amount calculation, based on pressure measurements. In one implementation, in order to increase accuracy and/or precision of level sensing with the sensor 200, a temperature sensing component may be utilized with the sensor 200. In an alternative implementation, temperature sensing may be provided by integration of the sensor 200 with a thermistor sensor level sensing system.

As an example, along with an increase in sensitivity and/or precision of the sensor 200, utilizing the temperature sensing unit with the sensor 200 may add an advantageous feature of measuring a real temperature of the fluid contents (e.g., colorants), which can be used by the user of the system. Further, for example, some solvent-based colorants may comprise a flash point at certain temperatures or pressures. In one implementation, measurement of ambient temperature and/or respective material (e.g., fluid) temperature may be used with the sensor 200 to determine whether the fluid of the dispenser canister 102 is nearing its respective flashpoint. For example, known flashpoint temperatures may be stored in a memory (not shown) coupled with a control circuit (not shown), which is coupled with or associated with a motor control board. Thus, for example, the addition of temperature measurement of the fluid may increase safety and address Underwriters Laboratories (UL) specification requirements.

In one implementation, an additional advantage of using a sensor to sense pressure may be an increased ease in calibration and tuning, if needed. In one implementation, calibration may comprise using the sensor 200 to take pressure measurements (e.g., fluid pressure, ambient pressure, and/or ambient temperature, etc.) with the dispenser canister 102 empty. As an example, the empty canister measurement may be performed by placing an empty dispenser canister into the system and activating the pressure sensor detection (e.g., by pressing a button), which is monitored by a control circuit of the system.

Alternatively, in one implementation, a calibration pressure measurement may be performed automatically when the sensor 200 determines that the dispenser canister 102 is empty. For example, fluid at a designated level can be determined. In this implementation, the dispenser canister 102 can be appropriately filled. A user may then indicate to the system that the dispenser canister 102 has been filled full or to some predetermined amount. In one example, the user can activate this function by pressing the same or different button of the system. Alternatively, the level sensing may determine that the dispenser canister 102 is appropriately full by determining fluid at a designated predetermined level. In this implementation, the system can take a subsequent full canister measurement (e.g., fluid pressure, ambient pressure, fluid temperature, and/or ambient temperature, etc.). In this implementation, the system can calibrate the sensor 200 using a comparison between the empty level measurement(s) and full level measurement(s). In one implementation, the user (e.g., or the system automatically) can activate a calibration once the dispenser canister 102 is full. In this implementation, for example, activating the calibration of the sensor 200 once filled can zero out the pressure sensor. Therefore, as the amount of material in the dispenser decreases, the pressure reading will deviate from the calibrated (e.g., zeroed out) reading.

Figure 11:
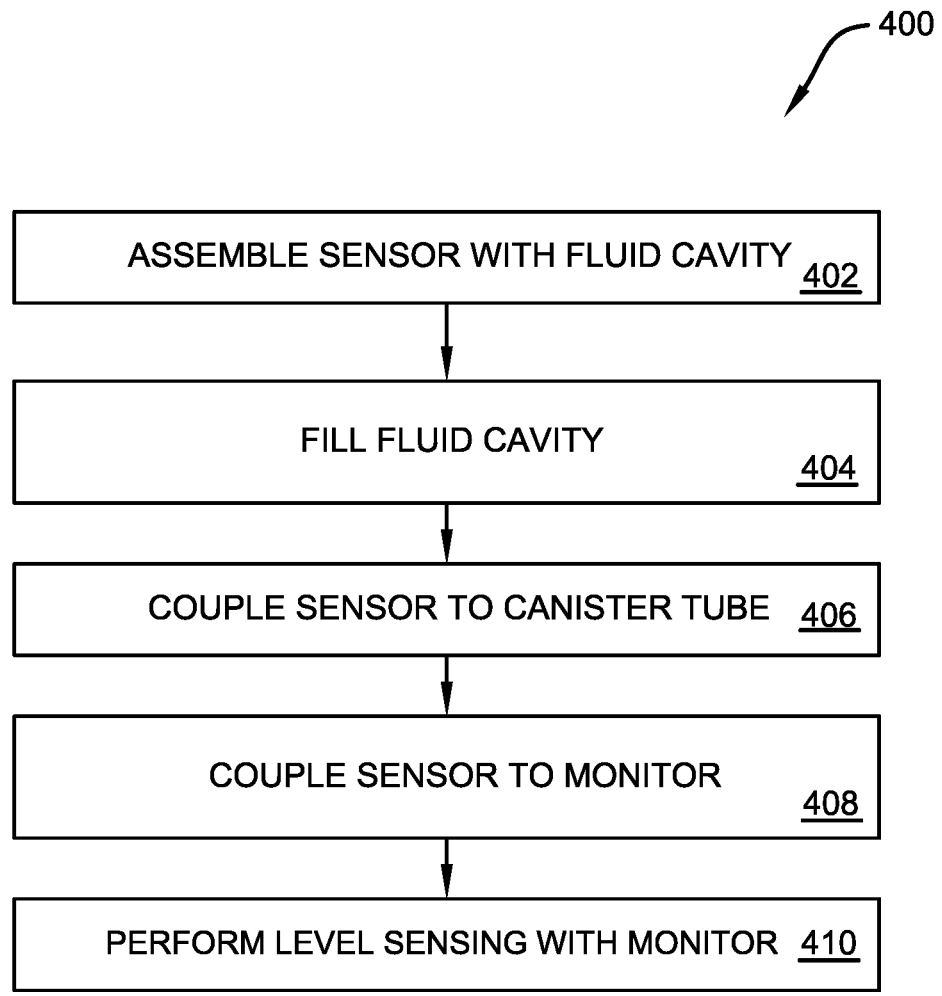
FIG. 11 illustrates an example implementation of a method for performing level sensing.

FIG. 11 is a flowchart 400 illustrating operations involved in level sensing according to one implementation. In some examples, the operations of the flowchart 400 are performed using the sensor 200 described herein. The flowchart 400 commences with operation 402, which includes assembling a sensor with a fluid cavity. For example, a pressure sensor is assembled to have the fluid cavity (e.g., a conically shaped fluid cavity as described herein) defined in part by a diaphragm as described in more detail herein. That is, a sensor arrangement with a sensing component that does not directly contact the measured fluid is assembled.

Figure 12:
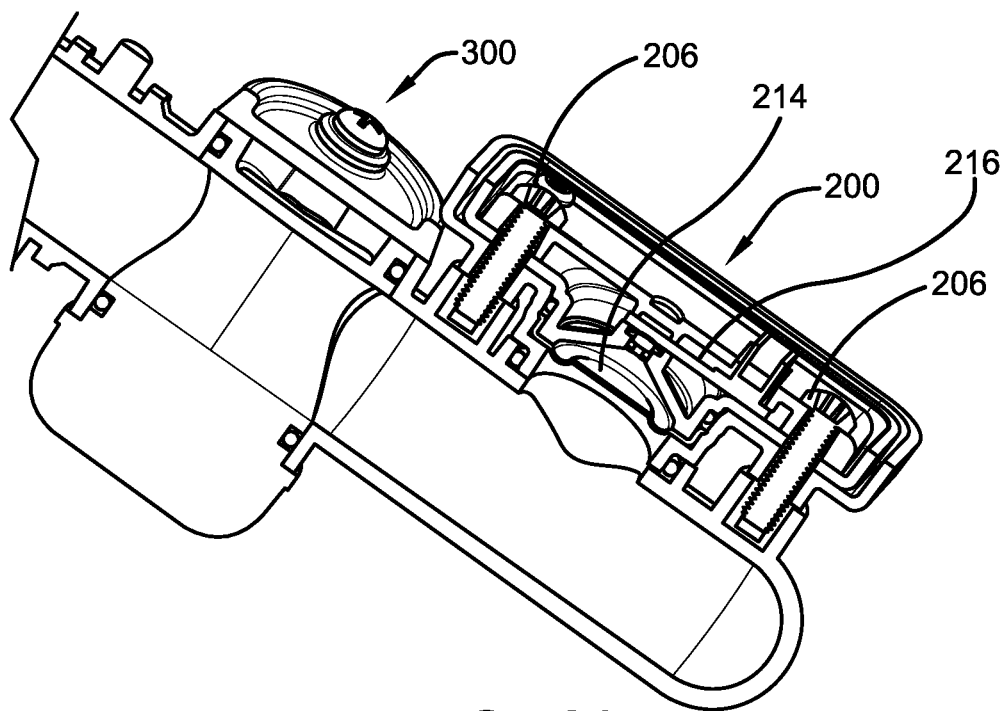
FIG. 12 is a cross sectional component diagram illustrating one or more portions of a sensor according to one implementation coupled to a dispenser canister tube.
Figure 13:
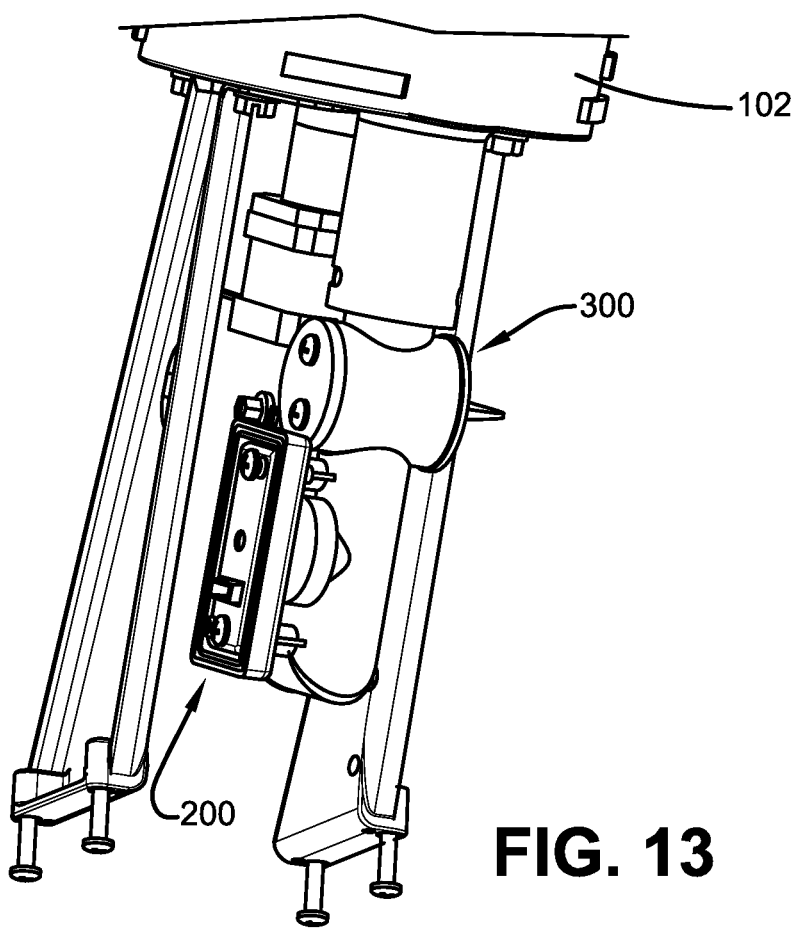
FIG. 13 is a cross sectional component diagram illustrating one or more portions of a sensor according to one implementation coupled to a dispenser canister tube and showing a shutoff valve.

The fluid cavity is filled at 404. For example, oil is injected within the cavity to completely fill the space or volume of the fluid cavity. The sensor is then coupled to a canister tube at 406. For example, the sensor is secured to a tube elbow below a dispenser canister as described in more detail herein (see also FIGS. 12 and 13). The sensor is then coupled to a monitor at 408. For example, an interface of the sensor is communicatively coupled to a monitor that is configured or programmed to monitor levels within the dispenser canister, such as to perform level sensing using pressure measurements. That is, level sensing is performed with the monitor at 410.

Thus, one or more implementations allow for level sensing, particularly of fluid in a canister (e.g., paint colorant in the dispenser canister 102), with a sensor that has increased robustness resulting from the indirect contact of the sensing device with the fluid.

Figure 14:
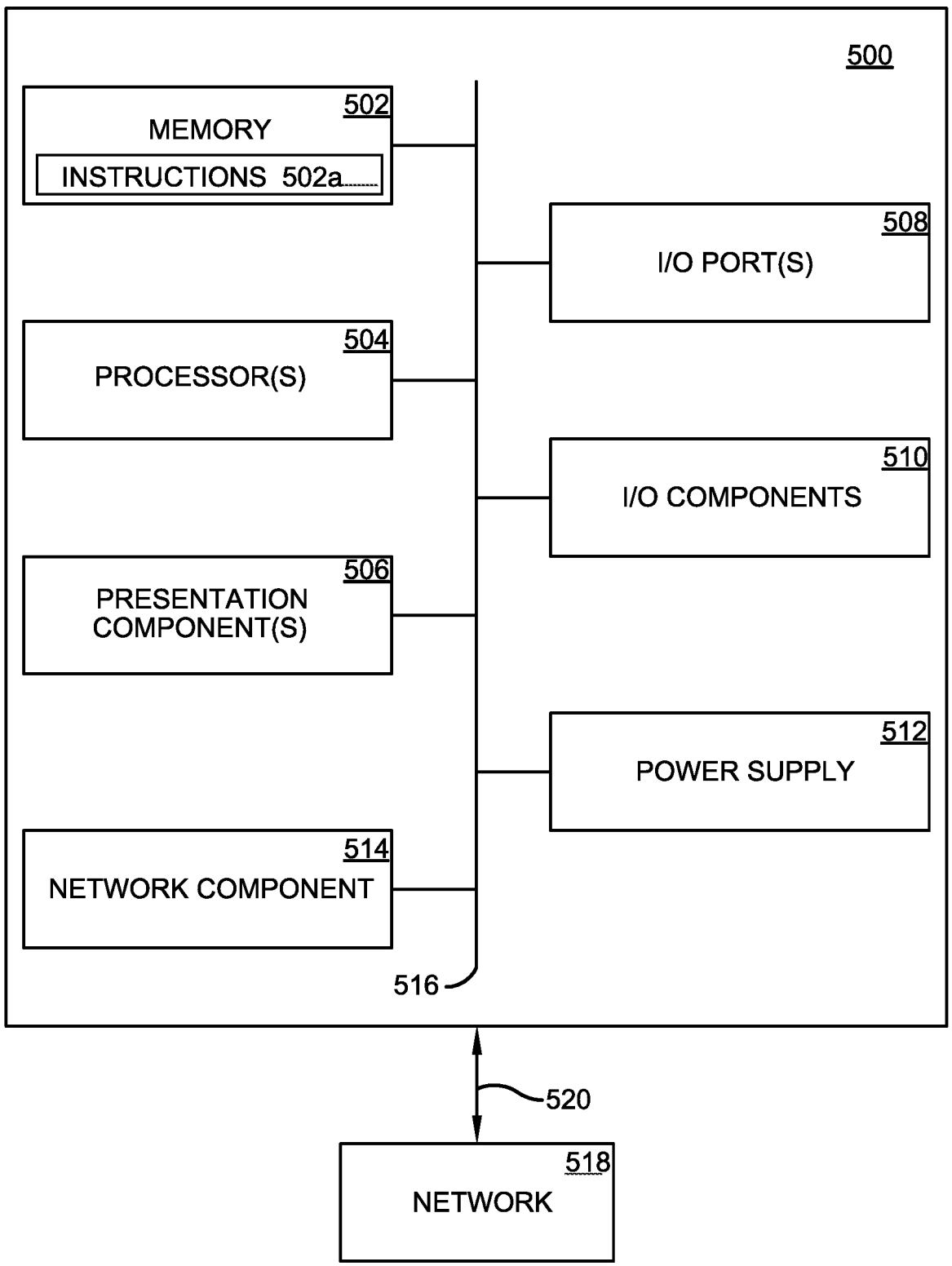
FIG. 14 is a block diagram of an example computing environment suitable for implementing various examples of level sensing.

With reference now to FIG. 14, a block diagram of a computing device 500 suitable for implementing various aspects of the disclosure is described (e.g., a level sensing or monitoring system). FIG. 5 and the following discussion provide a brief, general description of a computing environment in/on which one or more or the implementations of one or more of the methods and/or system set forth herein may be implemented. The operating environment of FIG. 5 is merely an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of "computer readable instructions" executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

In some examples, the computing device 500 includes a memory 502, one or more processors 504, and one or more presentation components 506. The disclosed examples associated with the computing device 500 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 5 and the references herein to a "computing device." The disclosed examples are also practiced in distributed computing environments, where tasks are performed by remote-processing devices that are linked through a communications network. Further, while the computing device 500 is depicted as a single device, in one example, multiple computing devices work together and share the depicted device resources. For instance, in one example, the memory 502 is distributed across multiple devices, the processor(s) 504 provided are housed on different devices, and so on.

In one example, the memory 502 includes any of the computer-readable media discussed herein. In one example, the memory 502 is used to store and access instructions 502a configured to carry out the various operations disclosed herein. In some examples, the memory 502 includes computer storage media in the form of volatile and/or nonvolatile memory, removable or non-removable memory, data disks in virtual environments, or a combination thereof. In one example, the processor(s) 504 includes any quantity of processing units that read data from various entities, such as the memory 502 or input/output (I/O) components 510. Specifically, the processor(s) 504 are programmed to execute computer-executable instructions for implementing aspects of the disclosure. In one example, the instructions 502a are performed by the processor 504, by multiple processors within the computing device 500, or by a processor external to the computing device 500. In some examples, the processor(s) 504 are programmed to execute instructions such as those illustrated in the flow charts discussed herein and depicted in the accompanying drawings.

In other implementations, the computing device 500 may include additional features and/or functionality. For example, the computing device 500 may also include additional storage (e.g., removable and/or non-removable) including, but not limited to, magnetic storage, optical storage, and the like. Such additional storage is illustrated in FIG. 14 by the memory 502. In one implementation, computer readable instructions to implement one or more implementations provided herein may be in the memory 502 as described herein. The memory 502 may also store other computer readable instructions to implement an operating system, an application program and the like. Computer readable instructions may be loaded in the memory 502 for execution by the processor(s) 504, for example.

The presentation component(s) 506 present data indications to an operator or to another device. In one example, the presentation components 506 include a display device, speaker, printing component, vibrating component, etc. One skilled in the art will understand and appreciate that computer data is presented in a number of ways, such as visually in a graphical user interface (GUI), audibly through speakers, wirelessly between the computing device 500, across a wired connection, or in other ways. In one example, the presentation component(s) 506 are not used when processes and operations are sufficiently automated that a need for human interaction is lessened or not needed. I/O ports 508 allow the computing device 500 to be logically coupled to other devices including the I/O components 510, some of which is built in. Implementations of the I/O components 510 include, for example but without limitation, a microphone, keyboard, mouse, joystick, pen, game pad, satellite dish, scanner, printer, wireless device, camera, etc.

The computing device 500 includes a bus 516 that directly or indirectly couples the following devices: the memory 502, the one or more processors 504, the one or more presentation components 506, the input/output (I/O) ports 508, the I/O components 510, a power supply 512, and a network component 514. The computing device 500 should not be interpreted as having any dependency or requirement related to any single component or combination of components illustrated therein. The bus 516 represents one or more busses (such as an address bus, data bus, or a combination thereof). Although the various blocks of FIG. 14 are shown with lines for the sake of clarity, some implementations blur functionality over various different components described herein.

The components of the computing device 500 may be connected by various interconnects. Such interconnects may include a Peripheral Component Interconnect (PCI), such as PCI Express, a Universal Serial Bus (USB), firewire (IEEE 1394), an optical bus structure, and the like. In another implementation, components of the computing device 500 may be interconnected by a network. For example, the memory 502 may be comprised of multiple physical memory units located in different physical locations interconnected by a network.

In some examples, the computing device 500 is communicatively coupled to a network 518 using the network component 514. In some examples, the network component 514 includes a network interface card and/or computer-executable instructions (e.g., a driver) for operating the network interface card. In one example, communication between the computing device 500 and other devices occurs using any protocol or mechanism over a wired or wireless connection 520. In some examples, the network component 514 is operable to communicate data over public, private, or hybrid (public and private) connections using a transfer protocol, between devices wirelessly using short range communication technologies (e.g., near-field communication (NFC), Bluetooth® branded communications, or the like), or a combination thereof.

The connection 520 may include, but is not limited to, a modem, a Network Interface Card (NIC), an integrated network interface, a radio frequency transmitter/receiver, an infrared port, a USB connection or other interfaces for connecting the computing device 500 to other computing devices. The connection 520 may transmit and/or receive communication media.

Although described in connection with the computing device 500, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure, such as controllers or monitors, are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprises computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A sensor for detecting a level of a fluid in a dispenser container, the sensor comprising:
    a housing having a fluid cavity configured to receive a fluid therein, the housing having an open end and an opening in a wall opposite the open end, wherein the housing comprises an upper housing and a lower housing;
    a diaphragm coupled to and closing the open end of the housing, the diaphragm having an edge, wherein the edge of the diaphragm is sandwiched between the upper and lower housings; and
    a sensing device having a sensing end, the sensing device coupled to the housing with the sensing end extending into the opening of the wall of the housing.

2. The sensor of claim 1, wherein the housing comprises conically shaped walls defining the fluid cavity.

3. The sensor of claim 1, wherein the housing comprises a plurality of openings extending therethrough, the plurality of openings configured to receive fasteners therein securing the housing to a tube elbow of the dispenser container.

4. The sensor of claim 1, further comprising a non-compressible oil within the fluid cavity.

5. The sensor of claim 1, wherein the upper housing comprises a shoulder having a seal positioned along the shoulder and the diaphragm is coupled to the upper housing abutting the seal.

6. A fluid dispensing system comprising:
    a dispenser canister;
    a tube elbow coupled to a bottom of the dispenser canister; and
    a sensor coupled to the tube elbow, the sensor comprising:
    a housing having a fluid cavity configured to receive a fluid therein, the housing having an open end and an opening in a wall opposite the open end;
    a diaphragm coupled to and closing the open end of the housing; and
    a sensing device having a sensing end, the sensing device coupled to the housing with the sensing end extending into the opening of the wall of the housing.

7. The fluid dispensing system of claim 6, further comprising a shutoff valve upstream of the sensor.

8. The fluid dispensing system of claim 7, wherein the shutoff valve comprises a rotatable barrel valve with an adjustment control, the adjustment control comprising a knob.

9. The fluid dispensing system of claim 6, wherein the dispenser canister is configured to store paint colorant therein.

10. The fluid dispensing system of claim 6, wherein the sensor is removably coupled to a wall of the tube elbow.

11. The fluid dispensing system of claim 6, wherein the sensing end of the sensor is configured for pressure sensing.

12. The fluid dispensing system of claim 6, wherein the housing of the sensor further comprises conically shaped walls defining the fluid cavity.

13. The fluid dispensing system of claim 6, wherein the housing of the sensor further comprises an upper housing and a lower housing, an edge of the diaphragm sandwiched between the upper and lower housings.

14. The fluid dispensing system of claim 6, wherein the housing of the sensor further comprises a plurality of openings extending therethrough, the plurality of openings configured to receive fasteners therein securing the housing to tube elbow of the dispenser container.

15. The fluid dispensing system of claim 6, wherein the sensor further comprises a non-compressible oil within the fluid cavity.

16. The fluid dispensing system of claim 6, wherein the housing of the sensor further comprises an upper housing and a lower housing, wherein the upper housing comprises a shoulder having a seal positioned along the shoulder and the diaphragm is coupled to the upper housing abutting the seal.

17. The fluid dispensing system of claim 6, wherein the sensor is removably coupled to the tube elbow.

18. A method for level sensing of a fluid in a dispenser container, the method comprising:
    assembling a sensor with a housing having a fluid cavity configured to receive a fluid therein, the housing having an open end and an opening in a wall opposite the open end wherein the housing comprises an upper housing and a lower housing, a diaphragm coupled to and closing the open end of the housing wherein an edge of the diaphragm is sandwiched between the upper and lower housings, and a sensing device having a sensing end, the sensing device coupled to the housing with the sensing end extending into the opening of the wall of the housing; and
    configuring the sensor for removable coupling to a tube elbow of the dispenser container.

19. The method of claim 18, further comprising configuring the housing to have conically shaped walls defining the fluid cavity.

* * * * *